United States Patent
Takahashi et al.

(10) Patent No.: US 9,184,831 B2
(45) Date of Patent: *Nov. 10, 2015

(54) MOBILE COMMUNICATION METHOD, RADIO BASE STATION, AND RELAY NODE

(75) Inventors: Hideaki Takahashi, Yokohama (JP); Wuri Andarmawanti Hapsari, Yokosuka (JP); Anil Umesh, Yokohama (JP); Mikio Iwamura, Tokyo (JP); Minami Ishii, Yokohama (JP)

(73) Assignee: NTT DOCOMO, INC., Tokyo (JP)

( * ) Notice: Subject to any disclaimer, the term of this patent is extended or adjusted under 35 U.S.C. 154(b) by 349 days.

This patent is subject to a terminal disclaimer.

(21) Appl. No.: 13/379,744

(22) PCT Filed: Jun. 22, 2010

(86) PCT No.: PCT/JP2010/060549
§ 371 (c)(1),
(2), (4) Date: Mar. 2, 2012

(87) PCT Pub. No.: WO2010/150776
PCT Pub. Date: Dec. 29, 2010

(65) Prior Publication Data
US 2012/0147809 A1    Jun. 14, 2012

(30) Foreign Application Priority Data

Jun. 22, 2009 (JP) ................ P2009-148134

(51) Int. Cl.
*H04B 7/14* (2006.01)
*H04B 7/26* (2006.01)
(Continued)

(52) U.S. Cl.
CPC .............. *H04B 7/2606* (2013.01); *H04B 7/155* (2013.01); *H04W 76/041* (2013.01); *H04W 84/047* (2013.01)

(58) Field of Classification Search
CPC ...................................... H04W 72/04
USPC ........ 370/312, 315, 328–339; 455/418, 456.1
See application file for complete search history.

(56) References Cited

U.S. PATENT DOCUMENTS 8,289,895 B2 * 10/2012 Yu et al. ................. 370/315
2006/0046643 A1 * 3/2006 Izumikawa et al. ........... 455/7
(Continued)

FOREIGN PATENT DOCUMENTS

| JP | 2008-48218 A | 2/2008 |
| KR | 1020020014106 A | 2/2002 |
| WO | 2008/137376 A2 | 11/2008 |

OTHER PUBLICATIONS

Coiler, III 3GPP TSG-RAN WG2 # 66, R2-093243, Delay Analysis for "Type 1" Relay.*

(Continued)

*Primary Examiner* — Iqbal Zaidi
(74) *Attorney, Agent, or Firm* — Osha Liang LLP

(57) ABSTRACT

A mobile communication method according to the present invention comprising a step A in which, when a predetermined trigger is detected, the radio base station DeNB notifies the relay node RN of a transmission timing of an MBSFN subframe by a signal for changing the configuration of an RRC connection that is set between the radio base station DeNB and the relay node RN, a step B in which the radio base station DeNB performs scheduling such that a downlink signal is transmitted to the relay node RN at the transmission timing of the MBSFN subframe, and a step C in which the relay node RN performs scheduling such that a downlink signal is transmitted at a timing other than the transmission timing of the MBSFN subframe.

3 Claims, 6 Drawing Sheets

(51) Int. Cl.
*H04B 7/155* (2006.01)
*H04W 76/04* (2009.01)
*H04W 84/04* (2009.01)

(56) References Cited

U.S. PATENT DOCUMENTS

| | | | | |
|---|---|---|---|---|
| 2009/0252075 | A1* | 10/2009 | Ji et al. | 370/312 |
| 2010/0316096 | A1* | 12/2010 | Adjakple et al. | 375/211 |
| 2011/0244788 | A1* | 10/2011 | Ode et al. | 455/7 |
| 2012/0028631 | A1* | 2/2012 | Chun et al. | 455/422.1 |
| 2012/0051451 | A1* | 3/2012 | Kwon et al. | 375/285 |

OTHER PUBLICATIONS

Coiler, III NPL; 3GPP TSG-RAN WG2#66, Apr. 27, 2009.*
NPL, 3GPP TSG-RAN WG2#66, Apr. 27, 2009.*
International Search Report w/translation from PCT/JP2010/060549 dated Aug. 24, 2010 (2 pages.)
3GPP TSG-RAN WG1 #55, R1-084686; "Updated WF on addressing forward compatibility in Rel-8"; AT&T et al.; Prague, Czech Republic; Nov. 10-14, 2008 (1 page).
Japanese Office Action w/English translation mailed on Aug. 24, 2010 issued in corresponding Japanese Application No. 2009-148134 (6 pages).
3GPP TR 36.814 v.0.4.1.; "3rd Generation Partnership Project; Technical Specification Group Radio Access Network; Further Advancements for E-UTRA Physical Layer Aspects (Release 9)"; Feb. 2009 (31 pages).
3GPP TS 36.331 V8.6.0; "3rd Generation Partnership Project; Technical Specification Group Radio Access Network; Evolved Universal Terrestrial Radio Access (E-UTRA) Radio Resource Control (RRC); Protocol specification (Release 8)"; Jun. 2009 (207 pages).
3GPP TS 36.300 V8.8.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2009 (157 pages).
Notice of Grounds for Rejection in corresponding Korean application No. 10-2011-7031169 dated Jun. 13, 2013 (6 pages).
Korean Patent Abstract, Publication No. 10-2002-0014106 dated Feb. 25, 2002 (1 page).
Extended European Search Report in counterpart European Patent Application No. 10792094.4 issued on Jun. 4, 2014 (6 pages).
Nortel; Discussion paper on the control channel and data channel optimization for relay link'; 3GPP TSG-RAN Working Group 1 Meeting #56bis, R1-091384; Seoul, Korea; Mar. 23-27, 2009 (9 pages).
Qualcomm Europe; "Introduction of blank subframe indication into SIB2"; 3GPP TSG-RAN WG2 #64, R2-086823; Prague, Czech Republic; Nov. 10-14, 2008 (22 pages).
Office Action in counterpart Chinese Application No. 201080027954.1 issued on Jul. 1, 2014 (12 pages).
Coiler, III; 'Delay Analysis for "'Type 1" Relay'; 3GPP TSG-RAN WG2 #66, R2-093243; San Francisco, USA; Apr. 27, 2009 (11 pages).
Office Action in counterpart Chinese Application No. 201080027954.1 issued on Jan. 26, 2015 (13 pages).

* cited by examiner

FIG. 3

```
-- ASN1START
RRCConnectionReconfiguration ::=     SEQUENCE {
    rrc-TransactionIdentifier            RRC-TransactionIdentifier,
    criticalExtensions                   CHOICE {
        c1                               CHOICE {
            rrcConnectionReconfiguration-r8    RRCConnectionReconfiguration-r8-IEs,
            spare7 NULL,
            spare6 NULL, spare5 NULL, spare4 NULL,
            spare3 NULL, spare2 NULL, spare1 NULL,
        },
        criticalExtensionsFuture         SEQUENCE {}
    }
}
                                                    ← (X)
RRCConnectionReconfiguration-r8-IEs ::= SEQUENCE {
    measConfig                           MeasConfig                          OPTIONAL,     -- Need ON
    mobilityControlInfo                  MobilityControlInfo                 OPTIONAL,     -- Cond HO
    dedicatedInfoNASList                 SEQUENCE (SIZE (1..maxDRB)) OF
                                         DedicatedInfoNAS                    OPTIONAL,     -- Cond nonHO
    radioResourceConfigDedicated         RadioResourceConfigDedicated        OPTIONAL,     -- Cond HO-toEUTRA
    securityConfigHO                     SecurityConfigHO                    OPTIONAL,     -- Cond HO
    nonCriticalExtension                 SEQUENCE {}                         OPTIONAL,     -- Need OP
}

SecurityConfigHO ::=                 SEQUENCE {
    handoverType                         CHOICE {
        intraLTE                         SEQUENCE {
            securityAlgorithmConfig          SecurityAlgorithmConfig         OPTIONAL,     -- Need OP
            keyChangeIndicator               BOOLEAN,
            nextHopChainingCount             NextHopChainingCount
        },
        interRAT                         SEQUENCE {
            securityAlgorithmConfig          SecurityAlgorithmConfig,
            nas-SecurityParamToEUTRA         OCTET STRING (SIZE (6))
        }
    },
    ...
}
-- ASN1STOP
```

FIG. 4

```
MBSFN-SubframeConfig ::=      SEQUENCE {
    radioframeAllocationPeriod      ENUMERATED { n1, n2, n4, n8, n16, n32 },
    radioframeAllocationOffset      INTEGER (0..7),
    subframeAllocation              CHOICE {
        oneFrame                    BIT STRING ( SIZE (6) ),
        fourFrames                  BIT STRING ( SIZE (24) )
    }
```

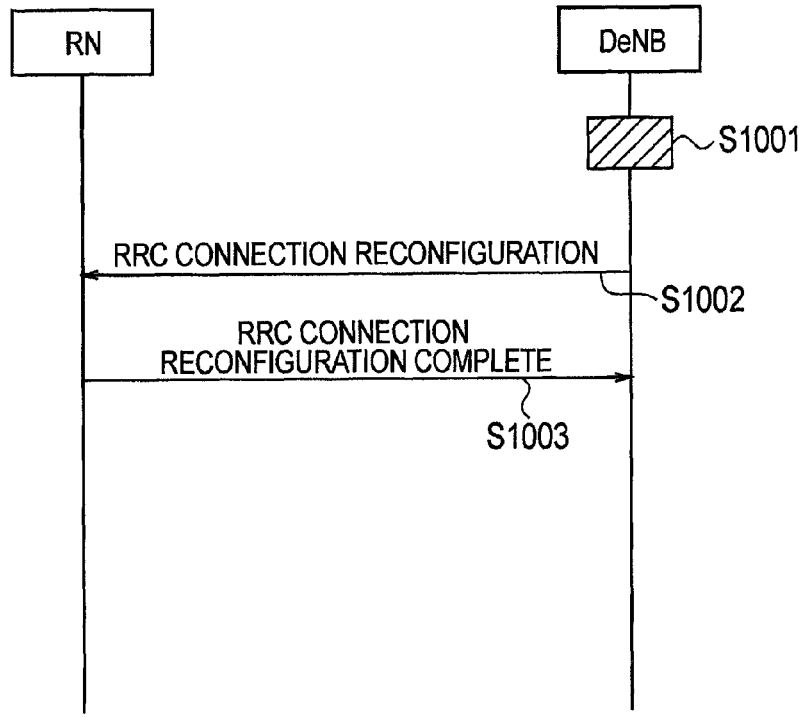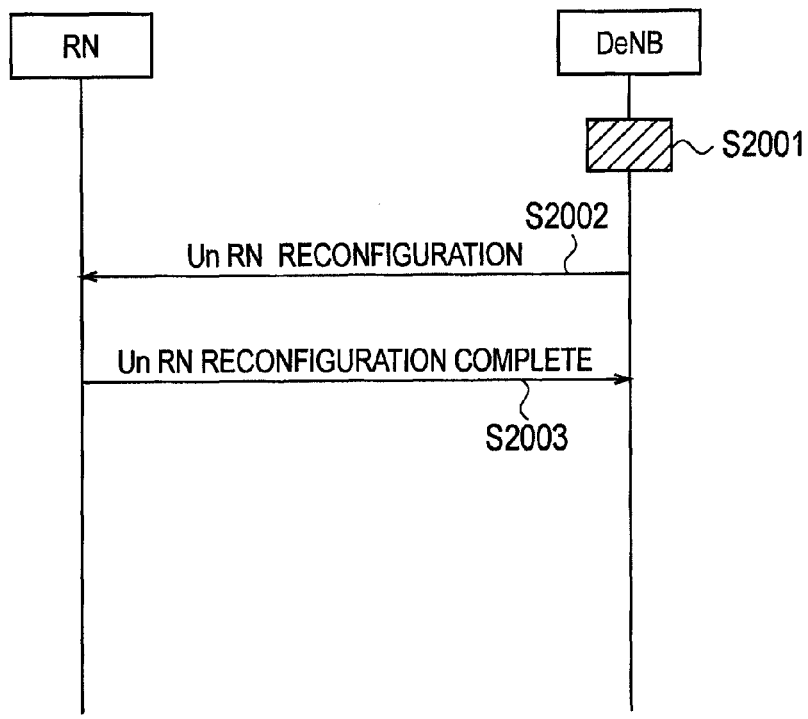

MOBILE COMMUNICATION METHOD, RADIO BASE STATION, AND RELAY NODE

TECHNICAL FIELD

The present invention relates to a mobile communication method, a radio base station, and a relay node.

BACKGROUND ART

In a mobile communication system employing an LTE (Long Term Evolution)-Advanced scheme which is a next-generation communication scheme of an LTE scheme, a "relay node RN" having the same function as that of a radio base station DeNB (Donor eNB) may be connected between a mobile station UE and the radio base station DeNB.

The LTE-Advanced mobile communication system is configured such that an E-RAB (E-UTRAN Radio Access Bearer) is set between the mobile station UE and a core node CN, a Uu radio bearer is set between the mobile station UE and the relay node RN, a Un radio bearer is set between the relay node RN and the radio base station DeNB, and an S1 bearer is set between the radio base station DeNB and the core node CN.

SUMMARY OF THE INVENTION

Problems to be Solved by the Invention

However, in the mobile communication system, when a process (reception process in the Un radio bearer) of receiving downlink signals from the radio base station DeNB by the relay node RN is simultaneously performed with a process (transmission process in the Uu radio bearer) of transmitting downlink signals to the mobile station UE by the relay node RN, or when a process (reception process in the Uu radio bearer) of receiving uplink signals from the mobile station UE by the relay node RN is simultaneously performed with a process (transmission process in the Un radio bearer) of transmitting uplink signals to the radio base station DeNB by the relay node RN, there is a problem that transmission signals of the relay node RN are turned to its own receiver, resulting in the occurrence of interference.

Therefore, the present invention has been achieved in view of the above-mentioned problems, and an object thereof is to provide a mobile communication method, a radio base station, and a relay node, by which interference to a receiver of a relay node itself, which occurs when transmission/reception process in a Un radio bearer and transmission/reception process in a Uu radio bearer are simultaneously performed, can be reduced.

Means for Solving the Problem

A gist of a first characteristic of the present invention is a mobile communication method, comprising, a step A in which, when a predetermined trigger is detected, a radio base station notifies a relay node of a predetermined timing by a signal for changing a configuration of a connection that is set between the radio base station and the relay node, a step B in which the radio base station performs scheduling such that a downlink signal is transmitted to the relay node at the predetermined timing, and a step C in which the relay node performs scheduling such that a downlink signal is transmitted at a timing other than the predetermined timing.

A gist of a second characteristic of the present invention is a radio base station, comprising, a notification unit configured to notify a relay node of a predetermined timing by a signal for changing a configuration of a connection that is set between the radio base station and the relay node when a predetermined trigger is detected, and a scheduling unit configured to perform scheduling such that a downlink signal is transmitted to the relay node at the predetermined timing.

A gist of a third characteristic of the present invention is a relay node, comprising, an acquisition unit configured to receive a signal for changing a configuration of a connection that is set between a radio base station and the relay node from the radio base station, and acquire a predetermined timing from the received signal, and a scheduling unit configured to perform scheduling such that a downlink signal is transmitted at a timing other than the predetermined timing.

Effect of the Invention

As described above, according to the present invention, it is possible to provide a mobile communication method, a radio base station, and a relay node, by which interference to a receiver of a relay node itself, which occurs when transmission/reception process in a Un radio bearer and a transmission/reception process in a Uu radio bearer are simultaneously performed, can be reduced.

BRIEF DESCRIPTION OF THE DRAWINGS

FIG. 3 is a diagram illustrating an example of a format of an "RRC Connection Reconfiguration" in the mobile communication system according to the first embodiment of the present invention.

FIG. 4 is a diagram illustrating an example of a method for notifying a subframe pattern in a mobile communication system according to the first embodiment of the present invention.

FIG. 6 is a sequence diagram illustrating an operation of a mobile communication system according to the first embodiment of the present invention.

FIG. 7 is a sequence diagram illustrating an operation of a mobile communication system according to a first modification of the first embodiment of the present invention.

BEST MODES FOR CARRYING OUT THE INVENTION

Configuration of Mobile Communication System According to First Embodiment of Present Invention With reference to FIG. 1 through FIG. 5, the configuration of a mobile communication system according to a first embodiment of the present invention will be explained.

Figure 1:
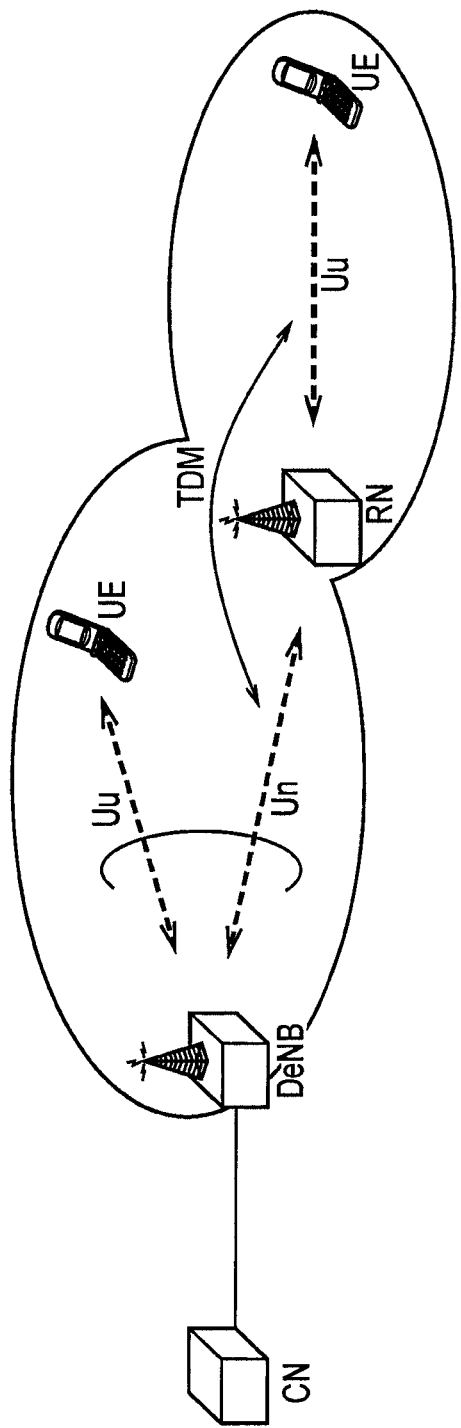
FIG. 1 is a diagram showing the entire configuration of a mobile communication system according to a first embodiment of the present invention.

As illustrated in FIG. 1, the mobile communication system according to the present embodiment is an LTE-Advanced mobile communication system, and includes a core node (e.g., a gateway device S-GW, a mobile switching center MME and the like) in a core network node, a radio base station DeNB, a relay node RN and the like.

Here, in the example of FIG. 1, a Uu radio bearer is set between the radio base station DeNB and the mobile station UE, a Un radio bearer is set between the radio base station DeNB and the relay node RN, and the Uu radio bearer is set between the relay node RN and the mobile station UE.

Further, it is assumed that SFN (System Frame Number) synchronization has been made between the radio base station DeNB and the relay node RN. That is, the relay node RN is configured to make synchronization for the radio base station DeNB at an SFN level based on SFN included in broadcast information transmitted by the radio base station DeNB.

Furthermore, the configuration is such that when the SFN synchronization is not made between the radio base station DeNB and the relay node RN, the radio base station DeNB detects the number of frames by which an SFN of a radio frame transmitted by the radio base station DeNB and an SFN of a radio frame transmitted by the relay node RN are shifted from each other at a same time (a shift of an SFN between the relay node RN and a second radio base station S-DeNB).

Further, the radio base station DeNB and the relay node RN are configured to transmit uplink signals and downlink signals using a time division multiplexing scheme.

Figure 2:
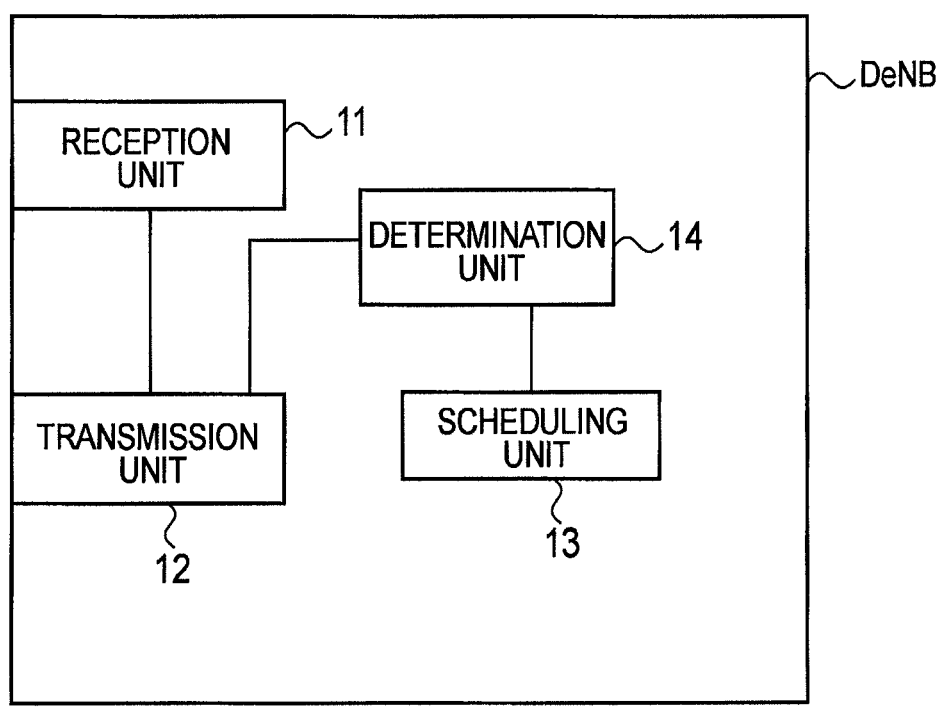
FIG. 2 is a functional block diagram of a radio base station according to the first embodiment of the present invention.

As illustrated in FIG. 2, the radio base station DeNB includes a reception unit 11, a transmission unit 12, a scheduling unit 13, and a determination unit 14.

The reception unit 11 is configured to receive uplink signals transmitted from the relay node RN via the Un radio bearer, uplink signals transmitted from the mobile station UE via the Uu radio bearer, and downlink signals transmitted from the core node CN.

The transmission unit 12 is configured to transmit downlink signals to the relay node RN via the Un radio bearer, downlink signals to the mobile station UE via the Uu radio bearer, and uplink signals to the core node CN.

Furthermore, when a predetermined trigger is detected, the transmission unit 12 may be configured to notify the relay node RN of a transmission timing of an MBSFN (Multicast Broadcast Single Frequency Network) subframe by an "RRC Connection Reconfiguration".

For example, as illustrated in FIG. 3, the transmission unit 12 may also set an "MBSFN subframe assignment pattern (refer to FIG. 4)" in a "criticalExtensionsFuture" (X) in an information element "criticalExtensions" in the "RRC Connection Reconfiguration", wherein the MBSFN subframe assignment pattern indicates the transmission timing of the MBSFN subframe.

Here, the MBSFN subframe is a subframe used in communication for MBSFN. In addition, in the present specification, the MBSFN subframe also includes an MBSFN subframe defined such that an OFDM symbol for a control signal called "Blank subframe" in the 3GPP meeting is not transmitted.

Furthermore, the "RRC Connection Reconfiguration" indicates a signal for changing the configuration of an RRC connection between the radio base station DeNB and the relay node RN.

For example, when modification conditions of an RRC connection having been set in advance in the radio base station DeNB are satisfied, the transmission unit 12 may be configured to determine that a predetermined trigger is detected.

The determination unit 14 is configured to determine the transmission timing of the MBSFN subframe to be notified to the relay node RN.

For example, the determination unit 14 may be configured to determine the transmission timing of the MBSFN subframe to be notified to the relay node RN in consideration of the number of relay nodes RNs and mobile stations UEs subordinate to the radio base station DeNB, and a traffic amount.

The scheduling unit 13 is configured to perform scheduling related to the relay node RN and the mobile station UE subordinate to the radio base station DeNB.

Specifically, the scheduling unit 13 is configured to perform scheduling such that the radio base station DeNB transmits downlink signals to the relay node RN at the transmission timing of the MBSFN subframe.

Figure 5:
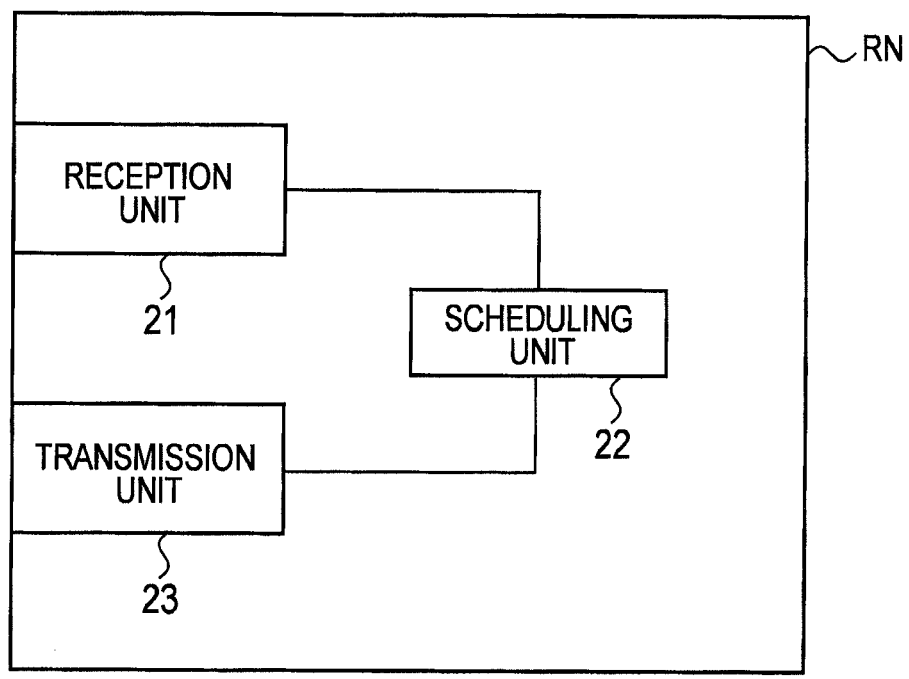
FIG. 5 is a functional block diagram of a relay node according to the first embodiment of the present invention.

As illustrated in FIG. 5, the relay node RN includes a reception unit 21, a scheduling unit 22, and a transmission unit 23.

The reception unit 21 is configured to receive downlink signals transmitted from the radio base station DeNB via the Un radio bearer, and uplink signals transmitted from the mobile station UE via the Uu radio bearer.

For example, when the reception unit 21 may be configured to acquire the transmission timing of the MBSFN subframe from the "RRC Connection Reconfiguration" received in the reception unit 21.

The scheduling unit 22 is configured to perform scheduling related to the mobile station UE subordinate to the relay node RN.

Specifically, the scheduling unit 22 is configured to perform scheduling such that the relay node RN transmits downlink signals at a timing other than the transmission timing of the MBSFN subframe.

That is, the scheduling unit 22 changes the transmission timing of the MBSFN subframe used for scheduling from a timing used until now to a timing notified by the "RRC Connection Reconfiguration".

The transmission unit 23 is configured to transmit uplink signals to the radio base station DeNB via the Un radio bearer, and transmit downlink signals to the mobile station UE via the Uu radio bearer.

Operation of Mobile Communication System According to First Embodiment of Present Invention With reference to FIG. 6, the operation of the mobile communication system according to the first embodiment of the present invention will be explained.

As illustrated in FIG. 6, if a predetermined trigger is detected in step S1001, the radio base station DeNB transmits an "RRC Connection Reconfiguration" for changing the configuration of an RRC connection having already been set to the relay node RN in step S1002.

Here, the radio base station DeNB notifies the relay node RN of a transmission timing of a new MBSFN subframe by the "RRC Connection Reconfiguration".

In step S1003, the relay node RN transmits an "RRC Connection Reconfiguration Complete" to the radio base station DeNB.

Then, the relay node RN performs scheduling of a downlink signal at a timing other than the transmission timing of the new MBSFN subframe notified in step S1002.

Operation and Effect of the Mobile Communication System According to First Embodiment of Present Invention In accordance with the mobile communication system according to the first embodiment of the present invention, it is possible to control a resource in the relay node RN in consideration of the number of relay nodes RNs and mobile stations UEs subordinate to the radio base station DeNB, and a traffic amount.

First Modification

With reference to FIG. 7, the mobile communication system according to a first modification of the first embodiment of the present invention will be explained. The mobile communication system according to the present first modification is explained below by focusing on the differences with the mobile communication system according to the first embodiment of the present invention mentioned above.

In the mobile communication system according to the present first modification, the transmission unit 12 of the radio base station DeNB may be configured to notify the relay node RN of the transmission timing of the MBSFN subframe by a "Un RN Reconfiguration", instead of the "RRC Connection Reconfiguration".

In addition, the "Un RN Reconfiguration" is a signal used for a procedure newly defined between the radio base station DeNB and the relay node RN.

Furthermore, the reception unit 21 of the relay node RN may be configured to acquire the transmission timing of the MBSFN subframe from the above-mentioned "Un RN Reconfiguration".

Hereinafter, with reference to FIG. 7, the operation of the mobile communication system according to the present first modification will be explained.

As illustrated in FIG. 7, if a predetermined trigger is detected in step S2001, the radio base station DeNB transmits a "Un RN Reconfiguration" for changing the configuration of an RRC connection having already been set to the relay node RN in step S2002.

Here, the radio base station DeNB notifies the relay node RN of a transmission timing of a new MBSFN subframe by the "Un RN Reconfiguration".

In step S2003, the relay node RN transmits a "Un RN Reconfiguration Complete" to the radio base station DeNB.

Then, the relay node RN performs scheduling of a downlink signal at a timing other than the transmission timing of the new MBSFN subframe notified in step S2002.

The characteristics of the present embodiment as described above may be expressed as follows:

A first characteristic of the present embodiment is that a mobile communication method includes a step A in which, when a predetermined trigger is detected, the radio base station DeNB notifies the relay node RN of a transmission timing (a predetermined timing) of an MBSFN subframe by a signal for changing the configuration of an RRC connection (a connection) that is set between the radio base station DeNB and the relay node RN, a step B in which the radio base station DeNB performs scheduling such that a downlink signal is transmitted to the relay node RN at the transmission timing of the MBSFN subframe, and a step C in which the relay node RN performs scheduling such that a downlink signal is transmitted at a timing other than the transmission timing of the MBSFN subframe.

A second characteristic of the present embodiment is that the radio base station DeNB includes the transmission unit 12 configured to notify the relay node RN of a transmission timing of an MBSFN subframe by a signal for changing the configuration of an RRC connection that is set between the radio base station DeNB and the relay node RN when a predetermined trigger is detected, and the scheduling unit 13 configured to perform scheduling such that a downlink signal is transmitted to the relay node RN at the transmission timing of the MBSFN subframe.

A third characteristic of the present embodiment is that the relay node RN includes the reception unit 21 configured to receive a signal for changing the configuration of an RRC connection that is set between the radio base station DeNB and the relay node RN from the radio base station DeNB, and acquire a transmission timing of an MBSFN subframe from the received signal, and the scheduling unit 22 configured to perform scheduling such that a downlink signal is transmitted at a timing other than the transmission timing of the MBSFN subframe.

In the first to third characteristics of the present embodiment, the above-mentioned signal may include an "RRC Connection Reconfiguration" or a "Un RN Reconfiguration".

It is noted that the operation of the above-described the radio base station DeNB, the relay node RN, the core node CN or the mobile station UE may be implemented by a hardware, may also be implemented by a software module executed by a processor, and may further be implemented by the combination of the both.

The software module may be arranged in a storage medium of an arbitrary format such as RAM (Random Access Memory), a flash memory, ROM (Read Only Memory), EPROM (Erasable Programmable ROM), EEPROM (Electronically Erasable and Programmable ROM), a register, a hard disk, a removable disk, and CD-ROM.

The storage medium is connected to the processor so that the processor can write and read information into and from the storage medium. Such a storage medium may also be accumulated in the processor. The storage medium and processor may be arranged in ASIC. Such the ASIC may be arranged in the radio base station DeNB, the relay node RN, the core node CN or the mobile station UE. Further, such a storage medium or a processor may be arranged, as a discrete component, in the radio base station DeNB, the relay node RN, the core node CN or the mobile station UE.

Thus, the present invention has been explained in detail by using the above-described embodiments; however, it is obvious that for persons skilled in the art, the present invention is not limited to the embodiments explained herein. The present invention can be implemented as a corrected and modified mode without departing from the gist and the scope of the present invention defined by the claims. Therefore, the description of the specification is intended for explaining the example only and does not impose any limited meaning to the present invention.

The invention claimed is:

1. A mobile communication method, comprising:
    a step A in which, when a predetermined trigger indicating conditions for modifying a connection that is set between a radio base station and a relay node is detected, the radio base station notifies the relay node of a transmission timing of a MBSFN (Multicast Broadcast Single Frequency Network) subframe by a signal for changing a configuration of the connection that is set between the radio base station and the relay node;
    a step B in which the radio base station performs scheduling such that a downlink signal is transmitted by using a time division multiplexing scheme to the relay node at the transmission timing of the MBSFN subframe; and
    a step C in which the relay node performs scheduling such that a downlink signal is transmitted by using a time division multiplexing scheme at a timing other than the transmission timing of the MBSFN subframe;
    wherein the connection is an RRC (Radio Resource Control) connection, and the signal is an "RN (Relay Node) Reconfiguration".

2. A radio base station, comprising a processor and associated memory, the processor being configured to:
    notify a relay node of a transmission timing of a MBSFN (Multicast Broadcast Single Frequency Network) subframe by a signal for changing a configuration of a connection that is set between the radio base station and the relay node when a predetermined trigger indicating conditions for modifying the connection between the radio base station and the relay node is detected; and perform scheduling such that a downlink signal is transmitted by using a time division multiplexing scheme to the relay node at the transmission timing of the MBSFN subframe, wherein the relay node performs scheduling such that a downlink signal is transmitted by using the time division multiplexing scheme at a timing other than the transmission timing of the MBSFN subframe; and wherein the connection is an RRC (Radio Resource Control) connection, and the signal is an "RN (Relay Node) Reconfiguration".

3. A relay node, comprising a processor and associated memory, the processor being configured to:

receive a signal for changing a configuration of a connection that is set between a radio base station and the relay node from the radio base station, and acquire a transmission timing of a MBSFN (Multicast Broadcast Single Frequency Network) subframe from the received signal; and perform scheduling such that a downlink signal is transmitted by using a time division multiplexing scheme at a timing other than the transmission timing of the MBSFN subframe;

wherein the connection is an RRC (Radio Resource Control) connection, and the signal is an "RN (Relay Node) Reconfiguration".

* * * * *